No. 863,166. PATENTED AUG. 13, 1907.
W. A. FOGELBERG.
SPEED INDICATOR.
APPLICATION FILED DEC. 5, 1906.
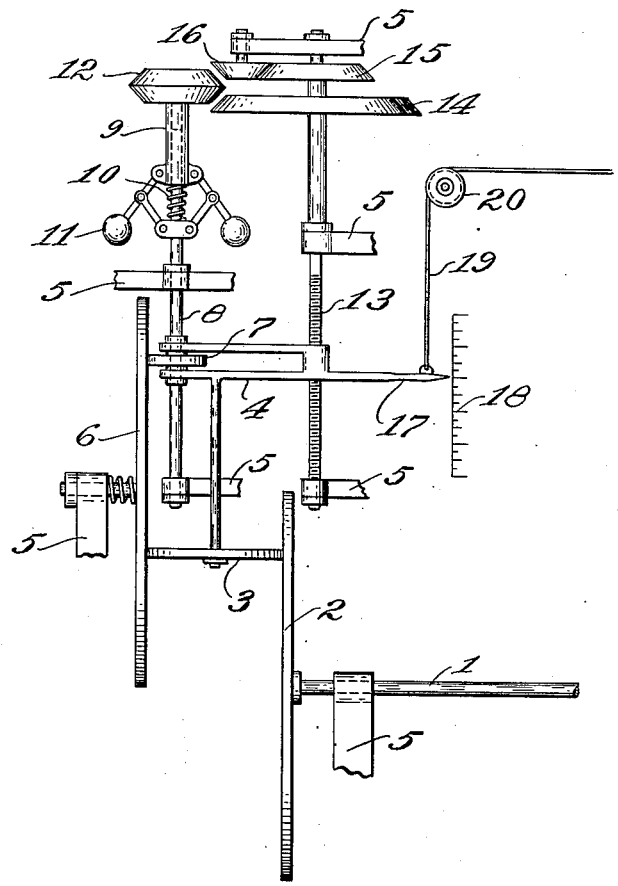

UNITED STATES PATENT OFFICE.

WILHELM AUGUST FOGELBERG, OF CHICAGO, ILLINOIS.

SPEED-INDICATOR.

No. 863,166.  Specification of Letters Patent.  Patented Aug. 13, 1907.

Application filed December 5, 1906. Serial No. 346,397.

*To all whom it may concern:*

Be it known that I, WILHELM AUGUST FOGELBERG, a subject of the King of Sweden, and a resident of Chicago, in the county of Cook and State of Illinois, and United States of America, have invented certain new and useful Improvements in Speed-Indicators, of which the following is a specification.

This invention relates to speed indicators of the centrifugal type.

The main object of this invention is to provide an improved form of speed indicator which is capable of accurately indicating a large range of speeds, which is positive in its operation and unaffected in its accuracy by the work of overcoming friction of its own parts even when it is called upon to simultaneously operate a number of registering or recording devices.

A further object is to provide a speed indicator which is equally accurate at all speeds throughout its range, and which is capable of being proportioned to suit any desired range of speeds.

These objects are accomplished by the device shown in the accompanying drawing which represents diagrammatically a speed indicating mechanism embodying this invention.

The illustration is confined to important features of the mechanism, the supporting frame and some of the minor details of construction being omitted so as to give a clear idea of the essential features of the invention.

In the drawing, the member whose speed changes are to be indicated is the shaft 1 or some part driven thereby. A friction wheel or disk 2 is mounted on the shaft 1 and has friction engagement with the periphery of a second wheel 3 which is journaled on a frame 4 mounted to shift radially of the wheel 2 for moving the wheel 3 toward and away from the axis of said wheel 2. Such portions of the supporting frame as are shown are designated 5 in the drawings. The friction wheel 3 engages a third friction wheel 6 which in turn drives a fourth friction wheel 7. The wheel 7 is splined to a driven shaft 8 rotatably mounted in the supporting frame 5 and secured against longitudinal shifting therein. The friction wheel 7 is also controlled in its position with reference to the axis of the wheel 6 by the frame 4. The system of friction wheels is arranged so as to increase the speed of the driven shaft 8 when the frame 4 moves away from the axis of the shaft or to decrease the speed of said driven shaft when the frame moves toward said axis.

The driven shaft 8 has a sleeve 9 splined at its upper end and normally urged upward by means of a spring 10. A centrifugal ball governor 11 carried by the shaft 8 tends to pull the sleeve 9 downward against the action of the spring 10 when said shaft exceeds a certain speed of rotation. The sleeve 9 carries at its upper end a friction wheel 12 having oppositely disposed conical surfaces.

The frame 4 is shifted by means of a threaded shaft 13 which is rotatably mounted in the frame 5 and secured against longitudinal shifting therein. The shaft 13 meshes with an internally threaded portion of the frame 4. The shaft 13 carries at its upper end a pair of friction cones 14 and 15, the cone 14 being adapted to have frictional contact with the friction roller 12 when the governor pulls the sleeve 9 downward; and the friction roller 15 being adapted to be driven through an intermediate friction roller 16, by the friction roller 12 when said roller 12 is lifted by the spring 10 through a reduction in the speed of the shaft 8. The frame 4 carries a pointer 17 which is moved along a graduated scale 18 through the shifting of the member 4 and thereby indicates changes in the speed of the shaft 1 as will be hereinafter described. The cord 19 passing over the pulley 20 indicates a connection for operating a distant indicator or speed recording mechanism not shown.

The operation of the device shown is as follows: The rotation of the shaft 1 drives the shaft 8. If the speed of the shaft 1 is insufficient to cause the balls of the governor 11 to fly outward against the action of the spring 10, then said spring will urge the friction wheel 12 into position for engaging the intermediate friction roller 16 and will thus cause the shaft 13 to rotate so as to move the frame 4 away from the axis of the disk 2, causing the shaft 8 to increase its speed. This action would continue until the speed of the shaft 8 were such as to cause the balls of the governor to fly outward and pull the friction wheel 12 into contact with the friction wheel 14. As there is no intermediate wheel in this case, the direction of rotation of the shaft 13 would now be opposite to that imparted by the friction wheel 15. This action causes the frame 4 to shift the wheel 3 toward the axis of the shaft 1. As the action of the threaded shaft 13 is to shift the frame 4 so as to counteract an increase or decrease of speed of the shaft 8, the various parts of the mechanism automatically adjust themselves so that the governor will rotate at a uniform speed and keep the friction roller 12 out of mesh with either the rollers 14 or 16. There is thus a certain position of the frame 4 which corresponds to each speed of the shaft 1. If the speed of the shaft 1 increases, then such increase of speed operates upon the governor 11 so as to lower the frame 4. Similarly a reduction in the speed of the shaft 1 will cause the governor to operate the shaft 13 so as to raise the frame 4. Since the sleeve 9 is splined to the shaft 8, the shaft 13 will be positively driven by the friction mechanism connecting it with the shaft 1 and the power available for operating registering and recording devices is much greater than that of the centrifugal action of the governor.

The indication of the device is equally accurate throughout the entire range of the movement of the frame 4 and the device is thus free from the most serious defects of the usual form of centrifugal speed indicator, in which the indicating devices are operated directly by the outward or inward movement of the weights of the centrifugal governor. In this case the movement of the weights of the governor merely throws the positively driven shifting mechanism into and out of operation. It is therefore possible by the herein described mechanism to simultaneously operate a multiplicity of indicating devices without reducing the accuracy of the indications.

The train of friction wheels connecting the shafts 1 and 8 is so arranged that the governor is extremely sensitive to slight variations in the speed of the shaft 1.

What I claim as my invention and desire to secure by Letters Patent is:

1. The combination of a friction wheel, a second friction wheel having driving contact with the first and movable toward and away from the axis of said first wheel while in driving contact therewith, a centrifugal governor operated by said second wheel, and means controlled by said governor and adapted to shift said second wheel away from the axis of the first through a decrease in the speed of said first wheel and to shift said second wheel toward the axis of said first wheel through an increase of the speed thereof.

2. The combination of a friction wheel, a second friction wheel having driving contact with the first and movable toward and away from the axis of said first wheel while in driving contact therewith, a centrifugal governor operated by said second wheel, means operated by said governor and adapted to shift said second wheel away from the axis of the first through a decrease in the speed of said first wheel and to shift said second wheel toward the axis of said first wheel through an increase in the speed thereof, and an indicator operated through the shifting of said second wheel and adapted to indicate a change in speed of said first wheel.

3. The combination of a friction wheel, a second friction wheel in contact with the first and movable toward and away from the axis thereof for varying the relative speeds of said wheels, a governor driven by said second wheel, and power-driven mechanism controlled by said governor for positively shifting said second wheel so as to maintain a substantially uniform speed of said governor regardless of changes in the speed of said first wheel.

4. The combination of a friction wheel, a second friction wheel in contact with the first and movable toward and away from the axis thereof for varying the relative speeds of said wheels, a governor driven by said second wheel, and power-driven mechanism controlled by said governor for positively shifting said second wheel so as to maintain a substantially uniform speed of said governor regardless of changes in the speed of said first wheel, and an indicating device controlled by said mechanism for indicating changes in the speed of said first wheel.

5. The combination of a friction wheel, a second friction wheel in driving contact with the first, means for moving said second wheel toward and away from the axis of said first wheel for changing the relative speeds of said wheels, a governor driven by said second wheel, a screw-threaded shaft operating said shifting means and adapted when rotated in opposite directions to shift said second wheel respectively toward and away from the axis of said first wheel, and means controlled by said governor and adapted to rotate said shaft in one direction through an increase of speed of the governor and to rotate said shaft in the opposite direction through a decrease in the speed of the governor, said last means being arranged to permit said governor to rotate at a certain predetermined speed without affecting the rotation of said shaft, and all being arranged to cause said second wheel to shift toward the axis of said first wheel through an increase in the speed of said first wheel and to shift away from said axis through a reduction in the speed of said first wheel.

6. The combination of a friction wheel, a second friction wheel in driving contact with the first, means adapted to move said second wheel toward and away from the axis of said first wheel for changing the relative speeds of said wheels, a governor driven by said second wheel, a screw-threaded shaft operating said shifting means and adapted when rotated in opposite directions to shift said second wheel respectively toward and away from the axis of said first wheel, means controlled by said governor and adapted to rotate said shaft in one direction through an increase of speed of the governor and to rotate said shaft in the opposite direction through a decrease in the speed of the governor, said last means being arranged to permit said governor to rotate at a certain predetermined speed without affecting the rotation of said shaft, all being arranged to cause said second wheel to shift toward the axis of said first wheel through an increase in the speed of said first wheel and to shift away from said axis through a reduction in the speed of said first wheel, and an indicating device operated by said shaft for indicating changes in the speed of said first wheel.

7. The combination of a friction wheel, a second friction wheel having driving contact with one face of the first wheel and mounted to move toward and away from the axis thereof, while in contact therewith, a centrifugal governor driven by said second wheel, a movable frame arranged for shifting said second wheel, a threaded shaft having threaded engagement with said frame for shifting the same through the rotation of said shaft, friction mechanism arranged for driving said shaft in opposite directions through the expansion and contraction of said governor under changes of speed, all being arranged to cause said second wheel to shift toward the axis of said shaft through an increase in the speed thereof, and to shift away from the axis of said shaft through a decrease in the speed thereof.

8. The combination of a friction wheel, a second friction wheel having driving contact with one face of the first wheel and mounted to move toward and away from the axis thereof, while in contact therewith, a centrifugal governor driven by said second wheel, a movable frame arranged for shifting said second wheel, a threaded shaft having threaded engagement with said frame for shifting the same through the rotation of said shaft, friction mechanism arranged for driving said shaft in opposite directions through the expansion and contraction of said governor under changes of speed, all being arranged to cause said second wheel to shift toward the axis of said shaft through an increase in the speed thereof, and to shift away from the axis of said shaft through a decrease in the speed thereof, and an indicator operated by said shaft for indicating changes in the speed of said first wheel.

Signed at Chicago, this 1st day of December, 1906.

WILHELM AUGUST FOGELBERG.

Witnesses:
E. A. RUMMLER,
RUDOW RUMMLER.